R. WOOD.
SIGHT GLASS.
APPLICATION FILED MAY 15, 1915.

1,164,694.

Patented Dec. 21, 1915.

Robert Wood, Inventor:
by William R. Baird
his Atty

UNITED STATES PATENT OFFICE.

ROBERT WOOD, OF BROOKLYN, NEW YORK, ASSIGNOR TO THE NATHAN MANUFACTURING COMPANY, OF NEW YORK, N. Y., A CORPORATION OF NEW YORK.

SIGHT-GLASS.

1,164,694.   Specification of Letters Patent.   Patented Dec. 21, 1915.

Application filed May 15, 1915. Serial No. 28,290.

*To all whom it may concern:*

Be it known that I, ROBERT WOOD, a subject of the King of Great Britain and Ireland, residing at Brooklyn, in the county of Kings and State of New York, have invented certain new and useful Improvements in Sight-Glasses, of which the following is a specification.

This invention relates to a sighting device for a sight feed lubricator or similar apparatus provided with apertures through which the condition of the interior of such apparatus is to be viewed, and its novelty consists in the construction and adaptation of the parts as will be more specifically pointed out hereinafter. Usually devices of this character comprise a tubular body with a cylindrical flange confined within a casing projecting from the frame or body of the apparatus and which glass is secured in place by any suitable means, as, for example, a circumferential nut, and is provided with a packing interposed between the glass and the interior of the casing of the apparatus in order to prevent leakage. In practice, it has been found difficult to remove a glass of this character from its casing after it has been in place for any length of time, because the parts are necessarily made with a tight fit and any usual form of packing under the influence of heat, pressure and the presence of steam, hot water, oil or oily vapors, tends to become disintegrated and to spread from the place in which it has been inserted and where it belongs and to cement the glass into position. In such a construction it is also necessary to use a packing especially adapted to fit within the casing and around the body of the glass.

The purpose of my invention is to obviate the difficulties and overcome the disadvantages inherent in the form of device above described, and I accomplish this purpose by placing a tubular extension of the glass within a chamber provided in the wall of the apparatus and placing the same under the tension of a spring so tempered that its temper is not apt to be lost by any temperature to which the parts are likely to be subjected, the spring being compressed when the glass is put in position. When the follower or nut holding the glass in position is released, the tension of the spring tends to disengage the glass from its position and makes it easily removable.

Figure 1:
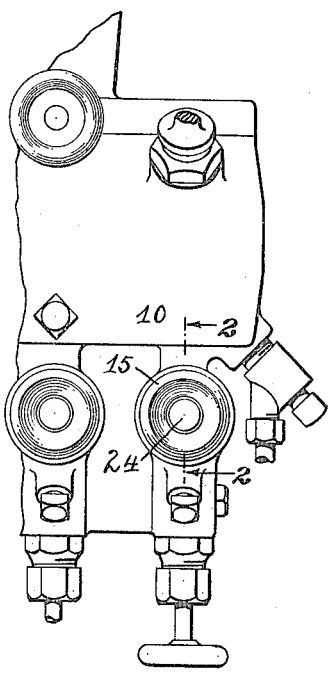
Figure 2:
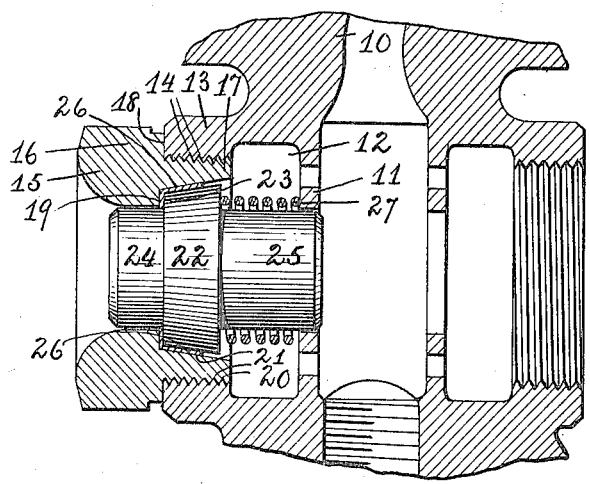

In the drawings, Figure 1 is an end elevation of a portion of an apparatus such as a sight feed lubricator provided with a casing and sight glass embodying a preferred form of the invention; and Fig. 2 is a transverse vertical section through a portion of the same on the plane of the line 2—2 in Fig. 1.

In the drawings, 10 represents a portion of the device to be provided with the sight glass. It is provided with a partition 11 having a central opening and spaced away from the partition to form a chamber 12 is an inturned annular flange 13 internally threaded as indicated at 14.

A follower or retainer 15 comprises an annular body 16 having an annular extension 17, an external shoulder 18 and an internal shoulder 19 being formed at the junction of the two parts, the shoulder 18 being adapted to abut against the annular flange 13 of the casing and the shoulder 19 being adapted to abut against a portion of the sight glass, the extension being externally threaded at 20 to engage the threads 14 of the flange 13 and formed with an internal annular sloping surface indicated at 21.

The sight glass itself comprises a central frusto conical body 22, adapted to fit within the internal annular sloping surface 21 of the extension 17 of the retainer 15 and one shoulder or edge of which body indicated at 23 abuts against the shoulder 19 of the retainer 15. It also comprises a cylindrical extension 24 adapted to fit within the annular part 16 of the retainer and a second cylindrical extension 25 adapted to fit in the aperture in the partition 11. A packing 26 is interposed between the body 22 and the retainer 15, and a compressed spring 27 is coiled around the extension 24 and rests against the partition 11 and the rear wall of the central body 22.

I claim:

1. The combination with a casing provided with a chamber having two walls each suitably apertured, of a sight glass adapted to rest against one wall and provided with an extension adapted to slidably pass through an aperture in the other wall in combination with a spring adapted to be compressed between the second wall and a portion of the sight glass to resist said sliding movement.

2. The combination with a casing of a sight glass having one portion of greater diameter than the other and a spring adapted to press between such portion of greater diameter and a part of the casing to place the sight glass under an outward tension and constituting the means for preventing its inward movement.

3. The combination with a casing having an internal sight glass seat, of a sight glass that engages the seat and is capable of inward movement away from the same, and a spring bearing against the sight glass to yieldingly hold the same against said seat.

4. The combination with a casing having an internal sight glass seat and a bearing portion within the casing spaced from the seat, of a sight glass that engages the seat and has a sliding mounting in the bearing, and a spring interposed between the bearing portion and a portion of the glass, said spring yieldingly holding the glass against the seat.

5. The combination with a casing having an opening in its external wall, of a follower detachably mounted in the opening and having an internal sight glass seat, said casing having a wall spaced from the inner end of the follower, a sight glass having a bearing against the seat, and a sliding bearing in the wall, said sight glass having a rearwardly facing shoulder, and a coiled spring surrounding the sight glass and interposed between the wall and shoulder for yieldingly holding the glass against the seat of the follower.

In testimony whereof I affix my signature in presence of two witnesses.

ROBERT WOOD.

Witnesses:
MARY H. LEWIS,
STEPHEN S. NEWTON.

Copies of this patent may be obtained for five cents each, by addressing the "Commissioner of Patents, Washington, D. C."